US012557933B2

(12) United States Patent
De Wet

(10) Patent No.: US 12,557,933 B2
(45) Date of Patent: Feb. 24, 2026

(54) BEVERAGE FILTER

(71) Applicant: Pieter Oloff De Wet, Vryheid (ZA)

(72) Inventor: Pieter Oloff De Wet, Vryheid (ZA)

( * ) Notice: Subject to any disclaimer, the term of this patent is extended or adjusted under 35 U.S.C. 154(b) by 804 days.

(21) Appl. No.: 17/758,743

(22) PCT Filed: Jan. 15, 2021

(86) PCT No.: PCT/IB2021/050287
§ 371 (c)(1),
(2) Date: Jul. 13, 2022

(87) PCT Pub. No.: WO2021/144748
PCT Pub. Date: Jul. 22, 2021

(65) Prior Publication Data
US 2023/0037611 A1 Feb. 9, 2023

(30) Foreign Application Priority Data

Jan. 15, 2020 (ZA) ................................. 2020/00253

(51) Int. Cl.
*A47J 31/06* (2006.01)
*A47J 31/00* (2006.01)
*A47J 31/36* (2006.01)
(52) U.S. Cl.
CPC ......... *A47J 31/0636* (2013.01); *A47J 31/005* (2013.01); *A47J 31/0663* (2013.01); *A47J 31/36* (2013.01)
(58) Field of Classification Search
CPC ...... A47J 31/005; A47J 31/0636; A47J 31/20; A47J 31/18; A47J 31/0663; A47J 31/36

USPC ................ 99/297, 302 P, 319, 322, 306, 323
See application file for complete search history.

(56) References Cited

U.S. PATENT DOCUMENTS

| | | | |
|---|---|---|---|
| 1,982,846 A | 12/1934 | Wales | |
| 2,311,759 A | 2/1943 | Johnson | |
| 7,559,274 B2 * | 7/2009 | Wilhite | A47J 31/20 |
| | | | 426/433 |
| 7,849,784 B2 * | 12/2010 | Adler | A47J 31/02 |
| | | | 99/287 |
| 2010/0224078 A1 * | 9/2010 | Khalifa | A47J 31/20 |
| | | | 99/323 |
| 2013/0239821 A1 * | 9/2013 | Boettcher | A47J 31/20 |
| | | | 99/317 |
| 2016/0262564 A1 | 9/2016 | Scott et al. | |
| 2019/0335936 A1 | 11/2019 | Pranckun | |

OTHER PUBLICATIONS

International Search Report and Written Opinion issued for International Patent Application No. PCT/IB2021/050287, mailed Apr. 26, 2021 in 9 pages.

* cited by examiner

*Primary Examiner* — Reginald Alexander
(74) *Attorney, Agent, or Firm* — Knobbe, Martens, Olson & Bear, LLP

(57) ABSTRACT

A beverage filter for insertion into a container is provided. The filter includes a base with a plurality of holes configured to let liquid pass through it while retaining solids. A wall extends from the base, wherein the wall is configured to allow at least a portion thereof to form a perimeter seal against an internal wall of the container. In operation a low pressure zone is created which pulls liquid through the holes of the base during removal of the beverage filter from the container.

10 Claims, 7 Drawing Sheets

1

12

8

4

18

2

6

BEVERAGE FILTER

CROSS-REFERENCE(S) TO RELATED APPLICATIONS

This application is the U.S. National Phase under 35. U.S.C. § 371 of International Application PCT/IB2021/050287, filed Jan. 15, 2021, which claims priority from South African provisional patent application number 2020/00253, which is incorporated by reference herein.

FIELD OF THE INVENTION

This invention relates to a beverage filter, more specifically to a beverage filter for making coffee.

BACKGROUND TO THE INVENTION

Various methods of brewing coffee are known. The appliances needed for these methods range from expensive coffee machines to basic coffee plungers.

Coffee is brewed using a wide range of techniques in which ground coffee beans, referred to as coffee grounds, have hot water passed through the coffee grounds to infuse the coffee into the water. Pressure is required when passing water through the coffee grounds in order to obtain the most flavor from the grounds. Some example techniques include an espresso machine, a stove top coffee maker, a plunger, and a percolator. While these techniques differ, the underlying principle of mixing hot water with ground coffee and finally separating the used coffee grounds from the liquid coffee is always present.

For people that cannot afford a coffee machine or that want to make coffee while traveling, coffee plungers are convenient as they are inexpensive and easy to use. However, if the coffee in a plunger is not used shortly after making it and remains within the plunger then the percolation continues which may lead to overly bitter coffee. Also, while plungers are more basic in construction compared to coffee machines, they still require various parts that fit together which increases production time and cost.

The current invention aims to address these problems at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a beverage filter for insertion into a container comprising:

a base with a plurality of holes configured to let liquid pass through it while retaining solids; and a wall that extends from the base, wherein the wall is configured to allow at least a portion thereof to form a perimeter seal against an internal wall of the container so that in operation a low pressure zone is created which pulls liquid through the holes of the base during removal of the beverage filter from the container.

The low pressure zone may be a volume created below the seal in the container which is of lower pressure than the area above the seal.

The perimeter seal may be formed by a portion of the wall that is compressible from a first dimension greater than an internal dimension of the container to provide a seal with the internal wall of the container. The perimeter seal may be a protruding sealing portion of the wall around the perimeter of the filter. The protruding sealing portion may be adjacent the base.

The wall may include elongate compression portions disposed at intervals around the perimeter of the wall that are compressible by the internal wall of the container when the filter is inserted into the container. The base may be formed of a circular member and the wall may be a cylindrical extension from the base and the elongate compression portions are radially compressible. The elongate compression portions may be arranged in an overlapping arrangement around the wall. The elongate compression portions may be vertical slits at intervals around the wall that are vertically staggered in an overlapping arrangement.

The wall may include a gripping surface configured to allow a user to grip the beverage filter when inserting or removing the beverage filter from a container. The gripping surface may be an enlarged rim.

The base may be interchangeable with another base that has different sized holes. The size of the holes in the base may be configured to restrict coffee grounds from passing through the beverage filter.

In accordance with another aspect of the invention there is provided a kit for preparing a beverage comprising: a container for retaining liquid; and a beverage filter for insertion into the container, the filter including a base with a plurality of holes configured to let liquid pass through it while retaining solids and a wall that extends from the base, wherein the wall is configured to allow at least a portion thereof to form a perimeter seal against an internal wall of the container so that in operation a low pressure zone is created which pulls liquid through the holes of the base during removal of the beverage filter from the container.

Embodiments of the invention will now be described, by way of example only, with reference to the accompanying drawings.

DETAILED DESCRIPTION WITH REFERENCE TO THE DRAWINGS

Figure 1:
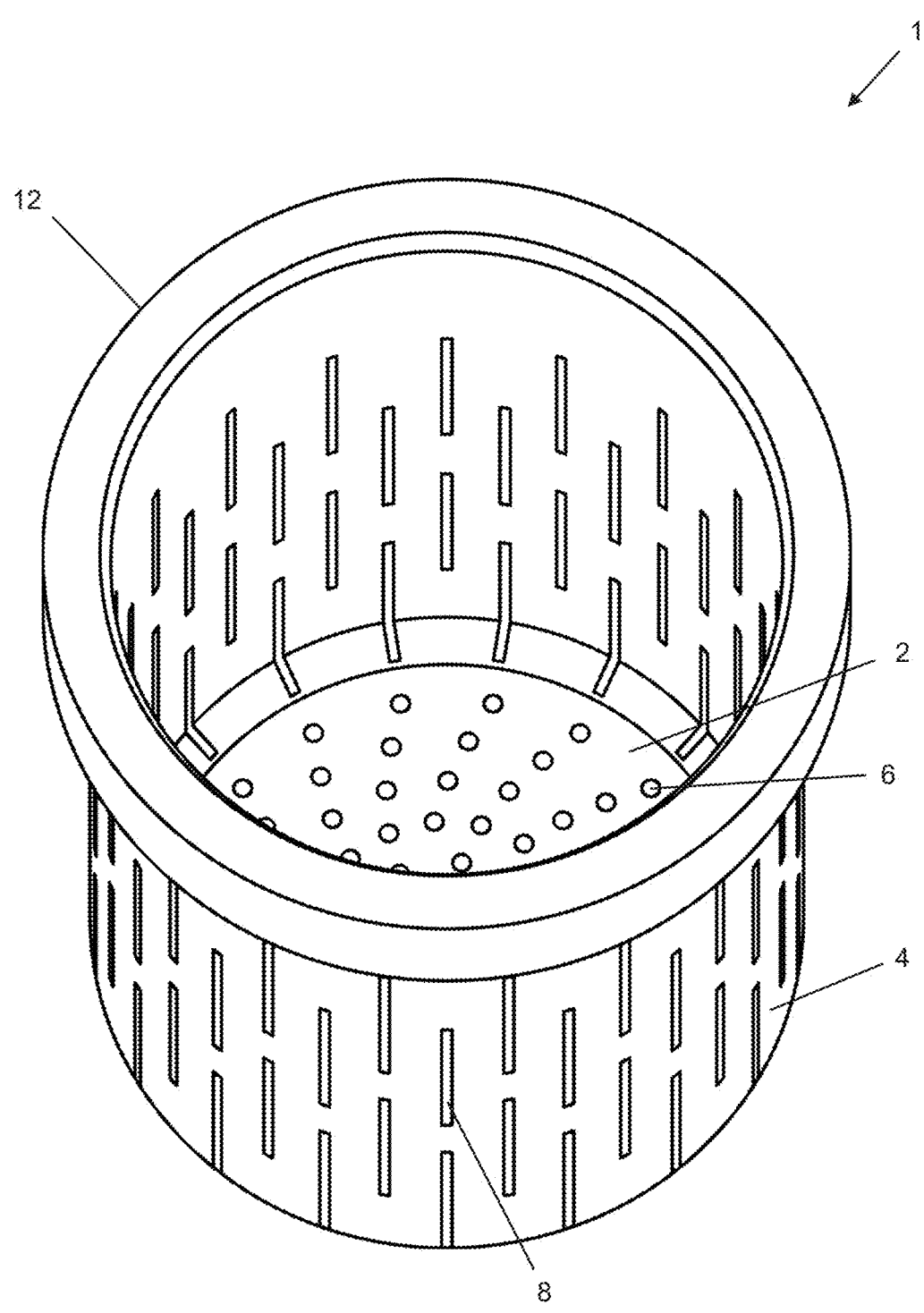
FIG. 1 is a three-dimensional top view of a first example embodiment of the beverage filter.

A beverage filter is provided for preparing a beverage from solids such as ground particles or powder. In one example, the beverage may be coffee and the solids may be ground coffee beans, referred to as coffee grounds. In another example, the beverage may be tea and the solids may be dried tea leaves. Other forms of beverage may also be used such as a hot or cold chocolate drink, or other hot and cold drinks made from powder or particles.

The beverage filter is provided for insertion into a container such as a drinking container or larger container for serving more than one person. The beverage filter is formed as an insert of corresponding size and shape to the internal dimensions of the container. In one embodiment, the beverage filter is of cylindrical form with one closed end forming the base and one open end configured to receive the solids and liquid in use, with a cylindrical joining side wall.

The beverage filter has a base with holes configured to let liquid pass through it while retaining solids. In operation, the coffee grounds will be retained in the beverage filter while a liquid, for example hot water, passes through the holes. The base may be a flat member, a flat area with an angled flange, or may be a concave area for holding the solids. The holes may be small circular apertures spaced apart covering the base or a portion of the base. Alternatively, the holes may be defined by a metal or wire mesh.

A wall extends from the base. The wall and base create a generally cup-shaped insert. The wall is configured to allow at least a portion thereof to form a perimeter seal against an internal wall of a cooperating container (such as a coffee mug). In operation the beverage filter is placed in a cooperating container, the beverage solids such as coffee grounds are added as well as hot or cold water and after some time the beverage filter is removed.

A partial vacuum or low-pressure zone is created below the seal which pulls liquid through the holes of the base during removal of the beverage filter from the container. As the filter is removed, the volume created below the seal in the container is of lower pressure than the area above the seal and this pulls the liquid in the filter through the holes and therefore through the solids in the base of the filter into the container. Forcing the liquid through the solids infuses the liquid with the flavor of the solids as it passes into the container. As the filter is removed from the container the infused liquid is left in the container.

The entire wall may form a seal with the cooperating container, or a section of the wall may be configured to form a seal. Alternatively, a seal (for example a flange) may be secured to the wall of the beverage filter. The seal may be located at or near the base of the beverage filter.

In one embodiment, the seal may be formed of a protruding sealing portion of the wall around the perimeter of the filter. For example, the protruding portion may be an annular extension to the external surface of the filter. This may be provided adjacent the base, adjacent the open top of the filter, or at an intermediate position. More than one sealing portion may be provided. In another embodiment, the seal may be formed of a protruding sealing portion of the wall in combination with a portion of the wall. For example, an upper portion of the wall may seal against the inside surface of the container as well as an annular seal protruding adjacent the base of the filter.

In another embodiment, the seal may be formed by a tight fit of the wall or a portion of the wall with the container. The perimeter seal may be formed by a portion of the wall that is compressible from a first dimension greater than an internal dimension of the container to provide a seal with the internal wall of the container. This may be provided by the wall including elongate compression portions, such as channels or slits, disposed at intervals around the perimeter of the wall that are compressible by the internal wall of the container when the filter is inserted into the container.

The elongate compression portions may be apertures to allow the wall to be radially compressible to cause a tight fit inside the container. The apertures are configured to deform and partially close when the beverage filter is inserted into a container, where the container has a reduced inner circumference compared to the beverage filter's outer circumference when the filter is in a relaxed, uninserted form. This may create a seal between the beverage filter and the container. The apertures may be slits and the slits may be of a staggered configuration with an overlap with each other. The slits may be generally vertical. The slits may be provided in a spaced configuration around the wall with rows of slits vertically staggered in an overlapping arrangement.

The base may be removeable from the filter and interchangeable with another base that has different sized holes to allow the user to make different beverages. Generally, the size of the holes in the base are configured to restrict coffee grounds from passing through the beverage filter.

A first embodiment of the invention is shown in FIGS. 1 to 4. The beverage filter (1) has a base (2) with a cylindrical wall (4) extending from the base (2).

The base (2) has holes (6) to allow a liquid, such as coffee, to pass through the beverage filter (1) while retaining solids such as coffee grounds. The wall (4) has elongate compression portions, in this embodiment slits (8), that overlap (i.e., the top part of one slit overlaps with the bottom part of an adjacent slit) and that are configured to deform and partially close when the beverage filter (1) is inserted into a container such as a mug (10) with a reduced inner circumference compared to the outer circumference of the beverage filter (1) before it is compressed.

In the illustrated embodiment, the slits extend vertically (i.e., transversely relative to the base of the beverage filter). The slits are configured and/or the material from which the wall is made is selected to permit radial compression of the cylindrical wall. The slits may further be configured and/or the material of the wall selected to bias the cylindrical wall to an expanded or uncompressed state. When the slits (8) deform and close, either completely or partially, the diameter of the beverage filter (1) is consequently reduced, thereby allowing the beverage filter (1) to fit snugly within the mug (10).

The beverage filter (1) may also include a gripping surface, which may be provided by an enlarged rim (12), to permit a user to easily grip and remove the beverage filter (1) once it has been pushed into the mug (10). The mug (10) may have a handle (14) to allow a user to easily grip the mug (10) when removing the beverage filter (1).

Figure 2:
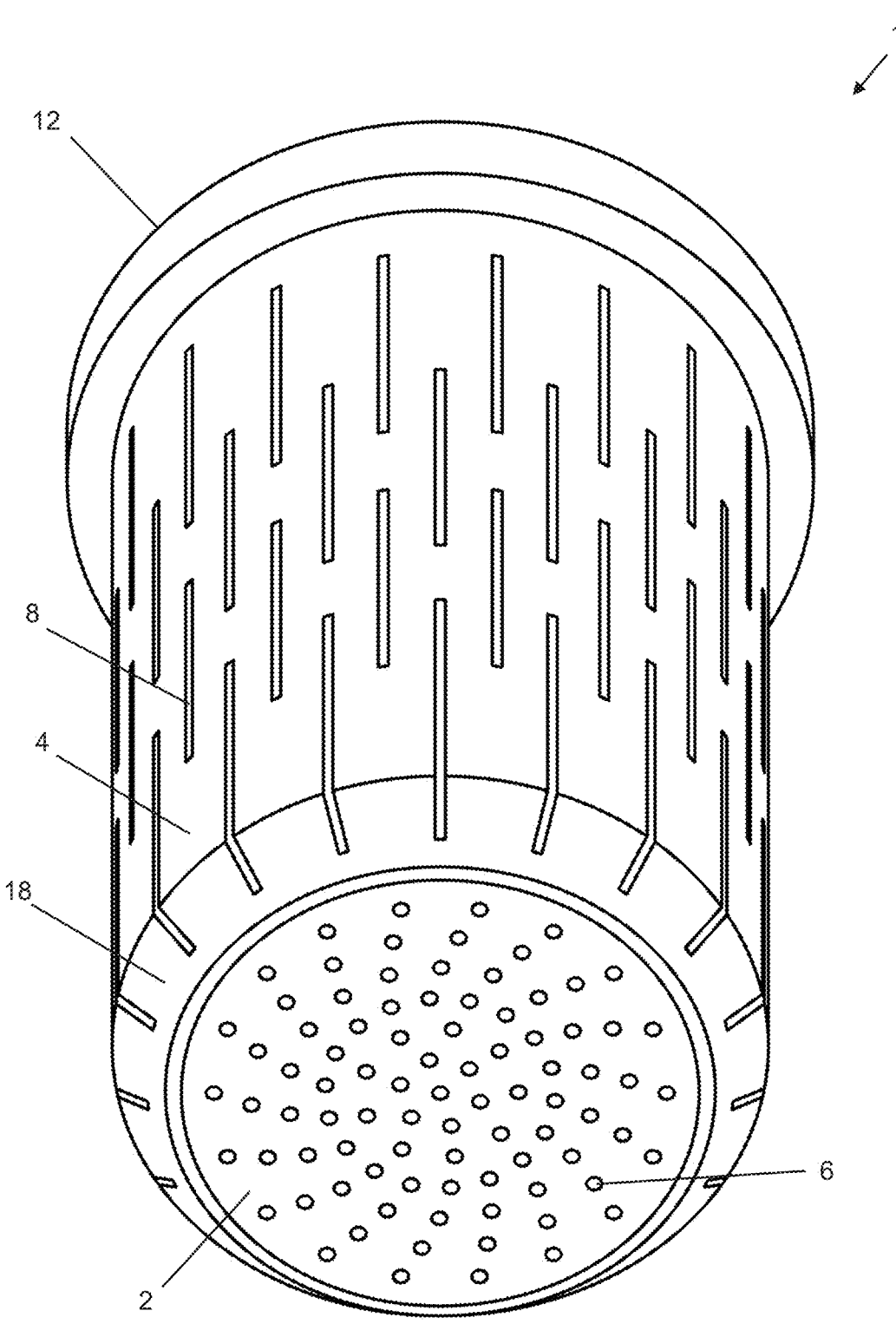
FIG. 2 is a three-dimensional bottom view of the beverage filter in FIG. 1.
Figure 3:
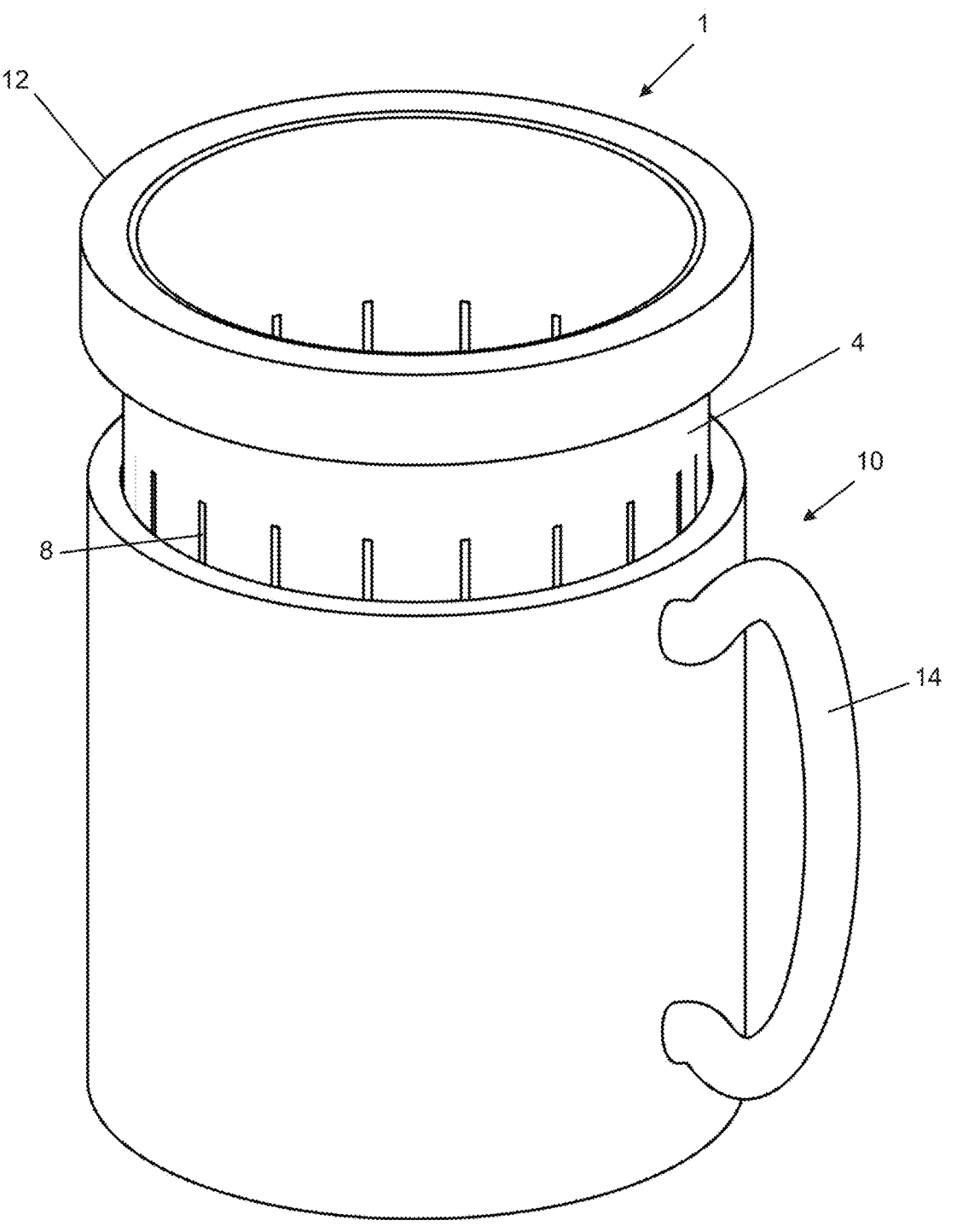
FIG. 3 is a three-dimensional view of the beverage filter placed in a mug.
Figure 4:
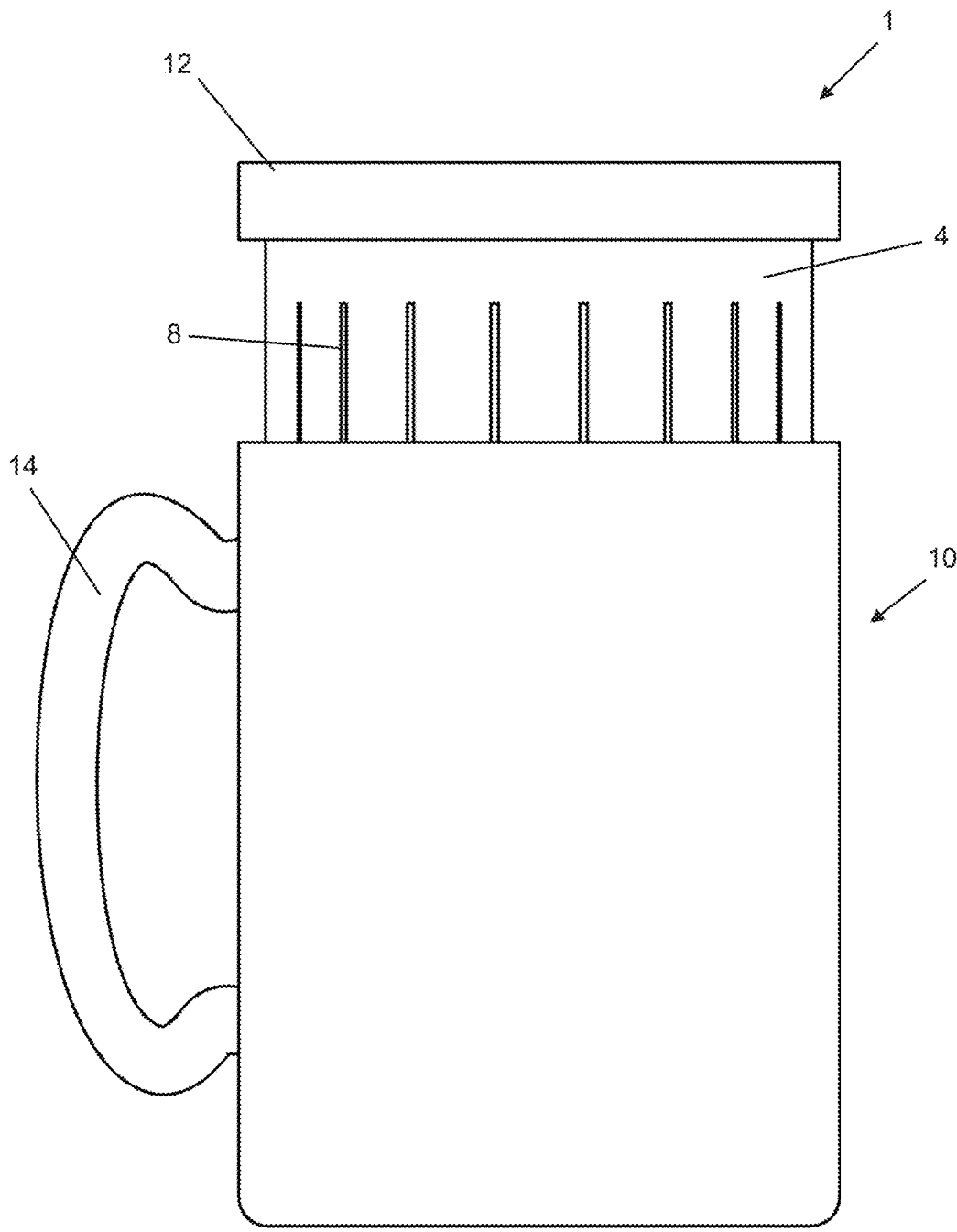
FIG. 4 is a side view of FIG. 3.

As shown in FIG. 2, a section of the wall (4) may have a conical portion (18) or flange that joins the wall to the base wherein the diameter of the base is less than the diameter of the wall.

Figure 5:
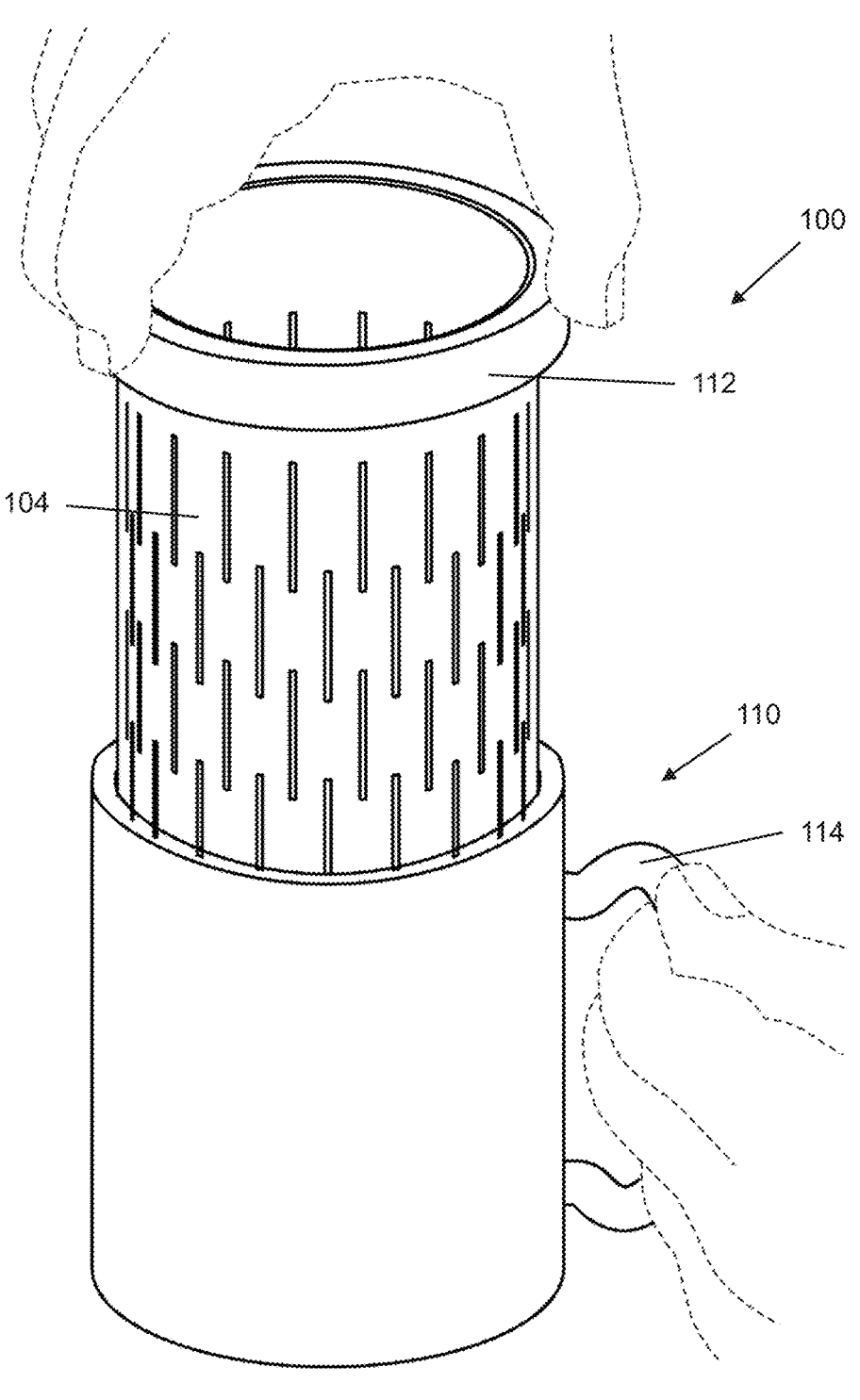
FIG. 5 is a photograph of a second example embodiment of the beverage filter in use.
Figure 6:
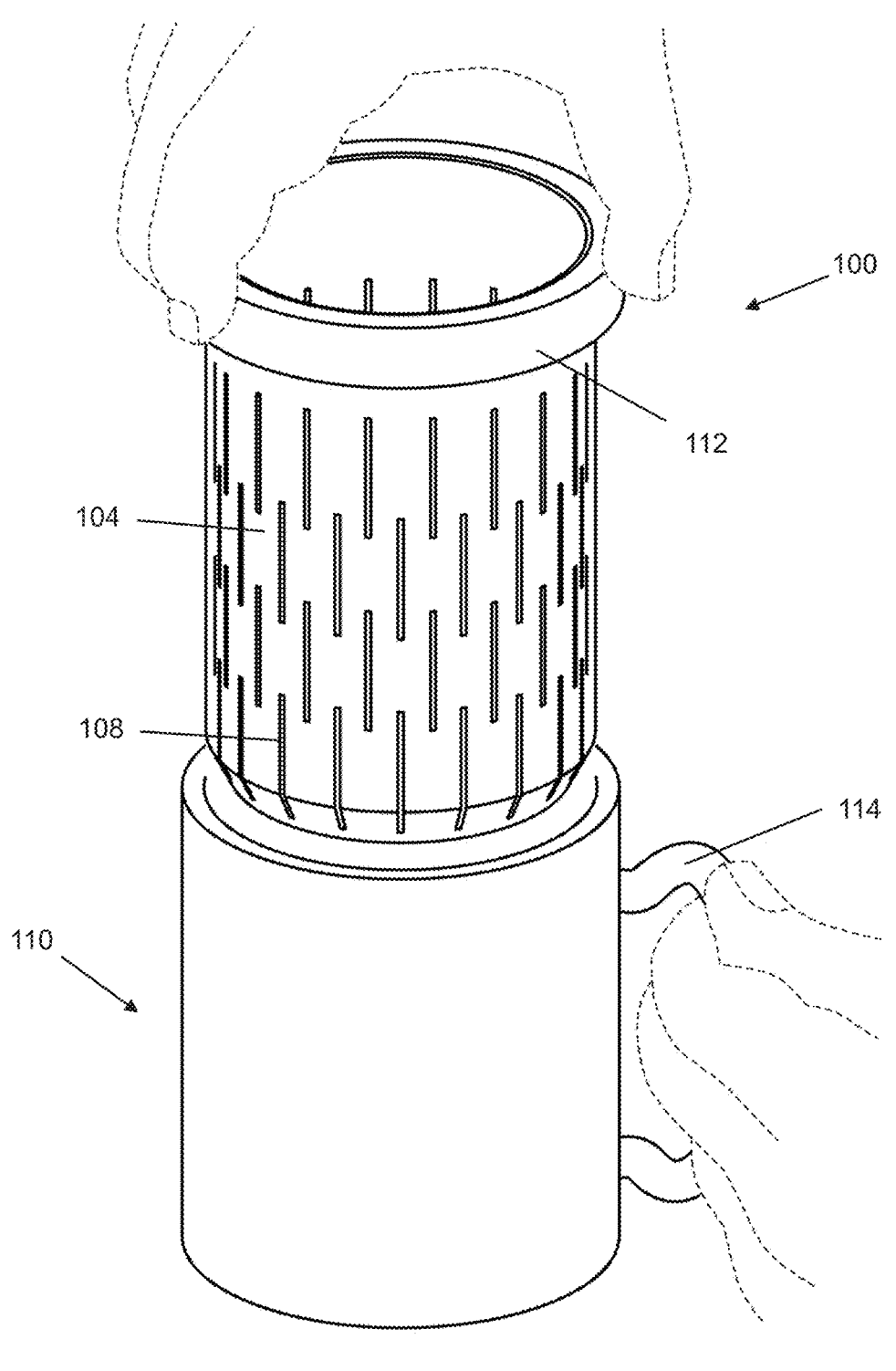
FIG. 6 is a photograph of the beverage filter of FIG. 5 removed from the mug.

As shown in FIGS. 5 and 6, in use, the user will push the beverage filter (100) completely into the container (110). The beverage filter (100) may slide in easily or may need to be pushed in with some force depending on the diameter of the beverage filter and the receiving container.

As the beverage filter (100) is urged into the mug (110), the wall (104) may be radially compressed to reduce the diameter thereof to allow the beverage filter to fit inside the mug (110). This compression may partially close the apertures or slits (108) as they are urged past the rim of the mug (110). This compression may provide or facilitate a seal between the cylindrical wall (104) of the beverage filter (100) and the wall of the mug (110). In some embodiments, a sealing member may form part of the wall of the beverage filter and it is not required for the beverage filter to have elongate compression portions or to be compressed during insertion. The wall of the beverage filter will still be adjacent the inner surface of the mug during operation.

Once the beverage filter is inserted into the cooperating container, the user may fill it with their preferred beverage ingredients, for example hot water and ground coffee. When liquid is poured into the beverage filter, the pressure from the liquid may assist in pushing the wall against the inner surface of the cooperating container. The coffee grounds may also effectively "plug" the apertures or slits in the wall and prevent coffee from passing through it. The water and coffee mixture should preferably be stirred and left to stand for a few minutes.

To remove the beverage filter (100), the user may hold the mug (110) down by its handle (114) in one hand and carefully pull the beverage filter (100) out with the other hand (similar to a piston from a cylinder).

Due to the expanding volume of the cavity defined between the base of the mug and the base of the beverage filter and a seal between the walls of the mug and wall of the beverage filter respectively, the pressure in this cavity becomes lower than the pressure inside the filter (i.e. in the space defined by the wall and base of the beverage filter). The upward pull and seal results in a pressure differential which causes the liquid to be pulled through the holes in the bottom or base of the beverage filter. The pressure differential, together with the variable diameter of the beverage filter, allows or aids the wall of the beverage filter to be pressed firmly against the inside of the mug to create a seal.

The partial vacuum or low-pressure zone that is created allows for the liquid to get pulled through the beverage filter. The coffee may therefore be extracted from the beverage filter at an increased rate compared to the normal pull of gravity. The coffee grounds will remain in the beverage filter and can be thrown out, while the freshly made coffee remains in the container.

Figure 7:
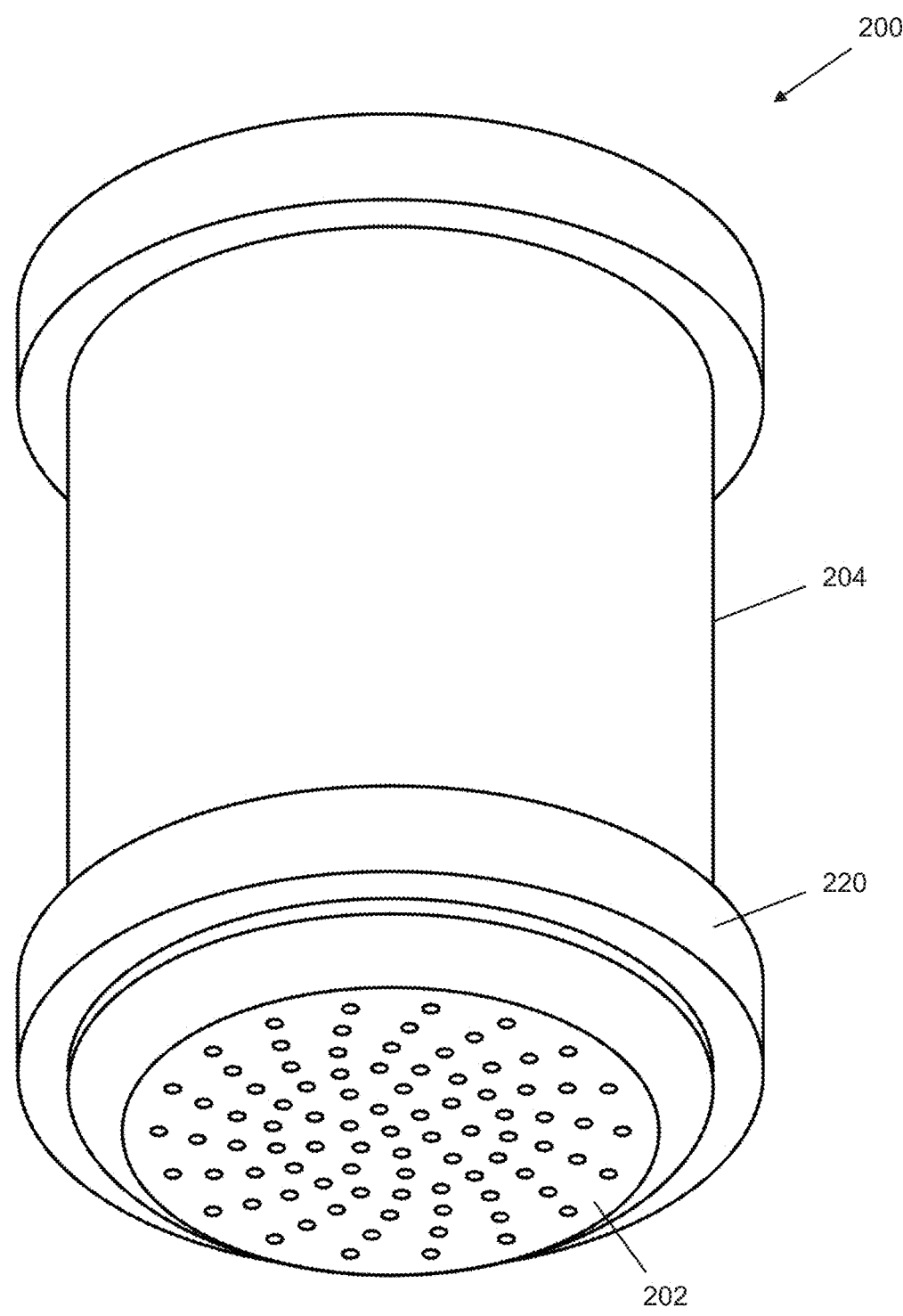
FIG. 7 is a three-dimensional view of a third example embodiment of the beverage filter.

As shown in a third embodiment in FIG. 7, the beverage filter (200) may have a seal (220) along its bottom edge close to the base (202) which seals against the inside wall of a cooperating container. In this case, the beverage filter (200) would not require elongate compression portions in the wall (204) and the outer circumference of the wall will preferably be slightly smaller than the inner circumference of the container. The seal may be located at any suitable position along the wall and may span the length of the wall. The seal may be integrally formed by the wall or may be attached to the wall.

While the slits and holes of the beverage filter may be configured to only let liquid pass through while retaining solids such as coffee grounds, a filter paper may also be inserted in the beverage filter to ensure little to no solid particles are included in the strained liquid.

The base of the beverage filter may be configured to be removed to allow different fittings to be secured to the beverage filter or to allow the base to be easily cleaned. Each interchangeable base may have different sized holes for different applications, for example for making tea.

The beverage filter and cooperating container may be sold together. Any suitable container of any shape and size may be used, provided that the accompanying beverage filter is dimensioned to fit within the container and form a seal.

As mentioned, the wall of the beverage filter may be compressible due to the elongate compression portions. The elongate compression portions in the wall of the beverage filter gives it the attribute of having a variable circumference which may be a cost-effective and simple way to assure a seal between the beverage filter and container. This tolerance of the beverage filter towards the container means that there is some flexibility with regards to the precision with which the containers are manufactured. It is therefore also possible to design the beverage filter to cooperate with existing mugs, already available on the market.

The container may be a coffee mug with a handle and vertical sides. It may be made of porcelain, plastic, glass or any other suitable material. The beverage filter may be cuplike in shape and may have a slightly larger outer circumference than the inner circumference of the container. The beverage filter sieve may be made of plastic, metal, silicon or any other suitable material or combination of materials and may be manufactured by injection moulding or by any other suitable means.

Depending on the material that is used to manufacture the beverage filter, it may be configured to be turned inside out to allow a user to easily clean the inside of the beverage filter. The beverage filter may also be configured to be collapsible for easy storage. Materials such as silicone or rubber or any other suitable material may be used.

The elongate compression portions in the wall of the beverage filter allow the outer circumference of the beverage filter to be variable. The outer circumference may therefore decrease by a few millimeters when the filter is in a compressed state. The elongate compression portions may therefore allow the beverage filter to fit snugly into a container.

The whole beverage filter may be made of a fine metal mesh. The elongate compression portions may be provided by metal wire with a diagonal weave which will allow the filter to be compressed.

It would also be possible to forego of the elongate compression portions in the beverage filter. A portion of the wall of the beverage filter may be configured to create a seal between the beverage filter and the container.

The elongate compression portions may be provided by slits or grooves in the wall of the filter. A portion of the wall may not be required to be compressible and may not have elongate compression portions, for example the part of the wall that extends from the container when in use and that may be used to grip the filter to remove it from the container. The elongate compression portions may be configured to span the section of the wall intended to be compressible. This may be achieved by either having elongate compression portions that span the length of the compressible section of the wall or by having shorter elongate compression portions along the wall arranged to partially overlap with each other. The elongate compression portions may be any suitable size to allow compression of the filter while limiting solids from passing through the filter. The elongate compression portions may be slits as illustrated or may be provided by radial depressed portions (channels) so that it would be corrugated as it is inserted into a container.

The beverage filter may have a lid to prevent the user from getting burned while using the beverage filter. Further, the rim of the filter where the user will grip it to remove it from the container may be made from a material that is a poor heat conductor to avoid a user from getting burned.

As the beverage filter has a simple design, the cost of manufacturing may be low and production time can be minimized. As the beverage filter may consist of only one part it can easily be transported and may be convenient for people who travel frequently, especially when going camping. The simplicity of the design may also allow for easy cleaning of the beverage filter.

Further, the beverage filter is configured to remove the coffee grounds from the coffee, unlike a traditional plunger, to prevent continuous percolation and increased bitterness.

In this respect the container may also be a larger beaker from which the coffee can be poured for several servings. Accordingly, different sized beverage filters may be manufactured. As mentioned, the beverage filter may also be used to make other beverages and for any other suitable task.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

What is claimed is:

1. A beverage filter for insertion into a container comprising:
a base with a plurality of holes configured to let liquid pass through it while retaining solids; and
a wall that extends from the base, wherein the wall is configured to allow at least a portion thereof to form a perimeter seal against an internal wall of the container so that in operation a low pressure zone is created which pulls liquid through the holes of the base during removal of the beverage filter from the container,
wherein the wall includes elongate compression portions disposed at intervals around the perimeter of the wall that are compressible by the internal wall of the container when the filter is inserted into the container.

2. The beverage filter as claimed in claim 1, wherein the low pressure zone is a volume created below the seal in the container which is of lower pressure than the area above the seal.

3. The beverage filter as claimed in claim 1, wherein the perimeter seal is formed by a portion of the wall that is compressible from a first dimension greater than an internal dimension of the container to provide a seal with the internal wall of the container.

4. The beverage filter as claimed in claim 1, wherein the base is formed of a circular member and the wall is a cylindrical extension from the base and the elongate compression portions are radially compressible.

5. The beverage filter as claimed in claim 1, wherein the elongate compression portions are vertical slits at intervals around the wall that are vertically staggered in an overlapping arrangement.

6. The beverage filter as claimed in claim 1, wherein the perimeter seal is a protruding sealing portion of the wall around the perimeter of the filter.

7. The beverage filter as claimed in claim 6, wherein the protruding sealing portion is adjacent the base.

8. The beverage filter as claimed in claim 1, wherein the wall includes a gripping surface configured to allow a user to grip the beverage filter when inserting or removing the beverage filter from a container.

9. The beverage filter as claimed in claim 8, wherein the gripping surface is an enlarged rim.

10. A kit for preparing a beverage comprising:
a container for retaining liquid; and
a beverage filter for insertion into the container, the filter including a base with a plurality of holes configured to let liquid pass through it while retaining solids and a wall that extends from the base, wherein the wall is configured to allow at least a portion thereof to form a perimeter seal against an internal wall of the container so that in operation a low pressure zone is created which pulls liquid through the holes of the base during removal of the beverage filter from the container,
wherein the wall includes elongate compression portions disposed at intervals around the perimeter of the wall that are compressible by the internal wall of the container when the filter is inserted into the container.

* * * * *